United States Patent
Tzur (10) Patent No.: US 10,930,012 B2
(45) Date of Patent: Feb. 23, 2021

(54) PROGRESSIVE 3D POINT CLOUD SEGMENTATION INTO OBJECT AND BACKGROUND FROM TRACKING SESSIONS

(71) Applicant: International Business Machines Corporation, Armonk, NY (US)

(72) Inventor: Yochay Tzur, Haifa (IL)

(73) Assignee: International Business Machines Corporation, Armonk, NY (US)

(*) Notice: Subject to any disclaimer, the term of this patent is extended or adjusted under 35 U.S.C. 154(b) by 34 days.

(21) Appl. No.: 16/417,675

(22) Filed: May 21, 2019

(65) Prior Publication Data
US 2020/0372676 A1   Nov. 26, 2020

(51) Int. Cl.
*G06T 7/73*   (2017.01)
*G06K 9/00*   (2006.01)
*G06T 7/194*   (2017.01)

(52) U.S. Cl.
CPC ............ *G06T 7/75* (2017.01); *G06K 9/00765* (2013.01); *G06T 7/194* (2017.01); *G06T 2207/10028* (2013.01); *G06T 2207/30244* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,957,548 B2* | 6/2011 | Meier | ................ | H04R 25/70 381/312 |
| 9,524,555 B2* | 12/2016 | Zhang | ................ | G06T 3/0075 |
| 9,818,043 B2* | 11/2017 | Sala | ................ | G06K 9/6201 |
| 9,868,212 B1* | 1/2018 | Hinterstoisser | ........ | B25J 9/1671 |
| 10,419,716 B1* | 9/2019 | Tanumihardja | ........ | G09B 19/00 |
| 2001/0043738 A1* | 11/2001 | Sawhney | ................ | G01S 5/163 382/154 |
| 2003/0012410 A1* | 1/2003 | Navab | ................ | G06K 9/209 382/103 |
| 2006/0233423 A1* | 10/2006 | Najafi | ................ | G06T 7/75 382/103 |
| 2010/0111370 A1* | 5/2010 | Black | ................ | G06K 9/00369 382/111 |
| 2012/0195471 A1* | 8/2012 | Newcombe | ............ | G06T 7/194 382/106 |
| 2014/0267614 A1* | 9/2014 | Ding | ................ | H04N 13/275 348/46 |
| 2016/0335792 A1* | 11/2016 | Forutanpour | ........... | G06T 19/00 |
| 2017/0193340 A1* | 7/2017 | Shtok | ................ | G06T 7/75 |

(Continued)

*Primary Examiner* — Tsung Yin Tsai
(74) *Attorney, Agent, or Firm* — Gregory J. Kirsch (57) ABSTRACT

Embodiments of the present systems and methods may provide techniques that provide automatic, reliable performance of the point cloud cleanup task. Embodiments may provide the capability to progressively learn the object-background segmentation from tracking sessions in augmented reality (AR) applications. The 3D point cloud may be used for tracking in AR applications, by matching points from the cloud to regions in the live video. A 3D point that has many matches is more likely to be part of the object, while a 3D point that rarely has matches is more likely to be part of the background. Advantages of this approach include that no manual work is needed to do the segmentation, and the results may be constantly improved over time, as the object is being tracked in multiple environments.

18 Claims, 5 Drawing Sheets

(56) References Cited

U.S. PATENT DOCUMENTS

| | | | |
|---|---|---|---|
| 2017/0220887 A1* | 8/2017 | Fathi | G06K 9/00201 |
| 2017/0228940 A1* | 8/2017 | Kutliroff | G06T 7/12 |
| 2017/0243352 A1 | 8/2017 | Kutliroff et al. | |
| 2018/0144458 A1* | 5/2018 | Xu | G06T 7/70 |
| 2018/0330504 A1* | 11/2018 | Karlinsky | G06T 7/74 |

* cited by examiner

PROGRESSIVE 3D POINT CLOUD SEGMENTATION INTO OBJECT AND BACKGROUND FROM TRACKING SESSIONS

BACKGROUND

The present invention relates to techniques for generating augmented reality content by automating point cloud cleanup using Fuzzy segmentation of points as corresponding to an object or to a background.

3D point cloud is a standard format for saving 3D models, which may include thousands of points, each with its position and color. Usually a point cloud is created during 3D reconstruction—a computational pipeline that computes the 3D geometry of a model of an object or scene given its video. Typically when reconstructing a 3D object from video, the resulting point cloud contains not only the object, but also some background elements, such as the desk on which the object is placed, the walls, the floor, and other objects seen on the video. For many applications of the 3D model, it is important to have a clean point cloud, listing only points belong to the object. Therefore the task of cleaning out the sections in the model which do not belong to the object is very important. This task is sometimes referred as "segmentation into 'object' and 'background'."

One approach for segmentation is manual deletion of background points using an interactive application that enables marking background regions and removing them. Tools like Blender and MeshLab are examples of this approach, which requires manual work and investment of time and thus is not scalable. A second approach is to use some heuristics, for example, thresholding the distance from the camera or computing compact blobs. These methods fail in the case that the object matches the assumptions about its size and distance from background elements.

Accordingly, a need arises for techniques that provide automatic, reliable performance of the point cloud object-background segmentation task.

SUMMARY

Embodiments of the present systems and methods may provide techniques that provide automatic, reliable performance of the point cloud segmentation task. Embodiments may provide the capability to progressively learn the object-background segmentation from tracking sessions in augmented reality (AR) applications. The 3D point cloud may be used for tracking in AR application, by matching points from the cloud to regions in the live video. A 3D point that has many matches is more likely to be part of the object, while a 3D point that rarely has matches is more likely to be part of the background. Advantages of this approach include that no manual work is needed to do the segmentation, and the results may be constantly improved over time, as the object is being tracked in multiple environments.

For example, in an embodiment, a method of generating augmented reality content, may be implemented in a computer comprising a processor, memory accessible by the processor, and computer program instructions stored in the memory and executable by the processor, and the method may comprise tracking, at the computer system, a 3D model of an object in a scene in a video stream as a camera moves about the scene, wherein the tracking comprises determining for each point for each frame in the video stream whether the point corresponds to the object or whether the point corresponds to the background, segmenting, at the computer system, each of the plurality of points into either a point corresponding to the object or a point corresponding to the background based on a probability that the point corresponds to the object and a probability that the point corresponds to the background, wherein the probability that the point corresponds to the object is higher for each point the more often the tracking identifies the point as an inlier and the probability that the point corresponds to the background is higher for each point the more often the tracking identifies the point as an outlier, and generating, at the computer system, augmented reality content based on the segmented 3D model of the object.

In embodiments, the tracking may comprise using the segmented 3D model of the object to estimate a pose of the camera with respect to the 3D model of the object. The 3D model of the object may be initially segmented using a default setting of the probability for each point, and for each frame, the probability for each point is updated based on whether the tracking determines that the point corresponds to the object or to the background. The default setting of the probability for each point may be 0.5, and the probability may be increased when the tracking matches the point to a pixel in the video frame and the probability is decreased when the tracking fails to match the point to any of the pixels in the video frame. 5. The 3D model of the object in the scene may comprise a 3D point cloud comprising a plurality of points including at least some points corresponding to the object and at least some points corresponding to a background of the scene. The video stream may be obtained from the camera moving about the scene.

In an embodiment, a system for generating augmented reality content may comprise a processor, memory accessible by the processor, and computer program instructions stored in the memory and executable by the processor to perform tracking a 3D model of an object in a scene in a video stream as a camera moves about the scene, wherein the tracking comprises determining for each point for each frame whether the point corresponds to the object or whether the point corresponds to the background, segmenting each of the plurality of points into either a point corresponding to the object or a point corresponding to the background based on a probability that the point corresponds to the object and a probability that the point corresponds to the background, wherein the probability that the point corresponds to the object is higher for each point the more often the tracking determines that the point corresponds to the object and the probability that the point corresponds to the background is higher for each point the more often the tracking determines that the point corresponds to the background, and generating augmented reality content based on the segmented 3D model of the object.

In an embodiment, a computer program product for generating augmented reality content may comprise a non-transitory computer readable storage having program instructions embodied therewith, the program instructions executable by a computer, to cause the computer to perform a method comprising tracking a 3D model of an object in a scene in a video stream as a camera moves about the scene, wherein the tracking comprises determining for each point for each frame whether the point corresponds to the object or whether the point corresponds to the background, segmenting each of the plurality of points into either a point corresponding to the object or a point corresponding to the background based on a probability that the point corresponds to the object and a probability that the point corresponds to the background, wherein the probability that the point corresponds to the object is higher for each point the more often the tracking determines that the point corresponds to the object and the probability that the point corresponds to the background is higher for each point the more often the tracking determines that the point corresponds to the background, and generating augmented reality content based on the segmented 3D model of the object.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques that provide automatic, reliable performance of the point cloud object-background segmentation task. Embodiments may provide the capability to perform automatic segmentation of a 3D point cloud into Object and Background segments by progressively learning the object-background segmentation from tracking sessions in augmented reality (AR) applications. In AR applications, a 3D model of one or more objects that are to be displayed in a scene in a video stream may be generated and displayed on a scene or on objects in a scene. In order to properly display such AR content, the position of the camera relative to the scene, and to objects in the scene on which AR content is to be displayed, may be determined, and tracked as the camera moves. A model of an object in the scene may be generated using 3D reconstruction to images or the video stream to generate a 3D point cloud of the object. The 3D point cloud may be used for tracking in AR application, by matching points from the cloud to regions in the live video.

Typically, a generated 3D model comprising a 3D point cloud cannot be used as is, as the point cloud may include points that are located on the background of the scene, rather than on the object to be tracked. A form of "cleaning" of the image or video stream may be applied to remove the background or to segment the points into points that are part of the object to be tracked and points that are not. Embodiments of the present systems and method may perform such cleaning automatically by segmenting the points into points that are part of the object to be tracked and points that are not. Such automatic segmentation may provide improved performance.

For example, embodiments may provide a method for progressive segmentation of a 3D point cloud into Object and Background. Embodiments may use tracking sessions to progressively associate points to Object and Background classes. Embodiments may use Fuzzy Segmentation rather than binary segmentation, and the segmentation may be considered a "side-effect" of the tracking process. A 3D point that has many matches to pixels in the video is considered as being an inlier point for tracking the object over time and is more likely to be part of the object, while a 3D point that rarely has matches to pixels in the video is more likely to be part of the background. Advantages of this approach may enable improved object detection and tracking, when objects are repositioned in various environments, and may further include that no manual work is needed to do the segmentation, and the results may be constantly improved over time, as the object is being tracked in multiple environments.

Figure 1:
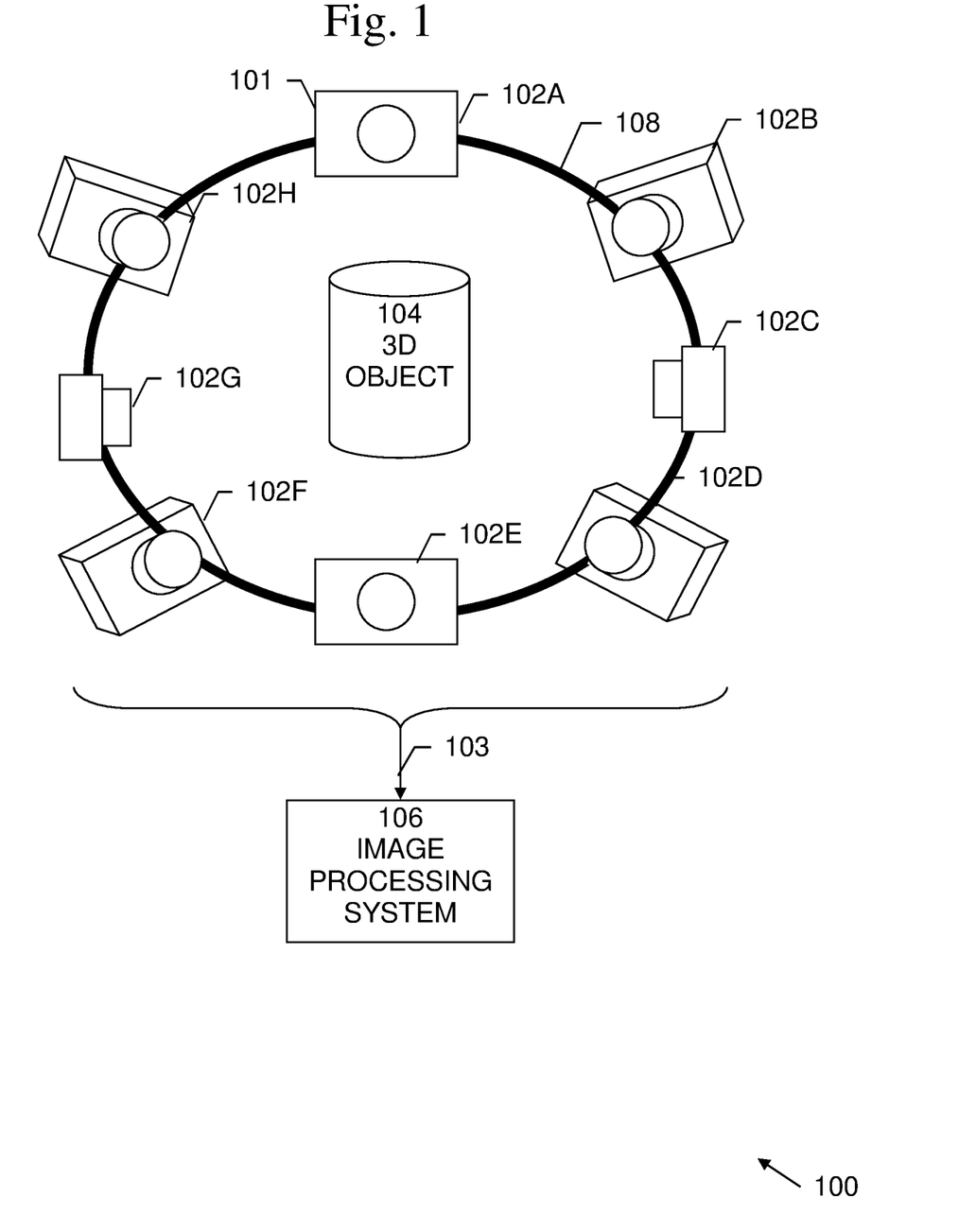
FIG. 1 illustrates an exemplary diagram of a system in which embodiments of the present systems and methods may be implemented.
Figure 3:
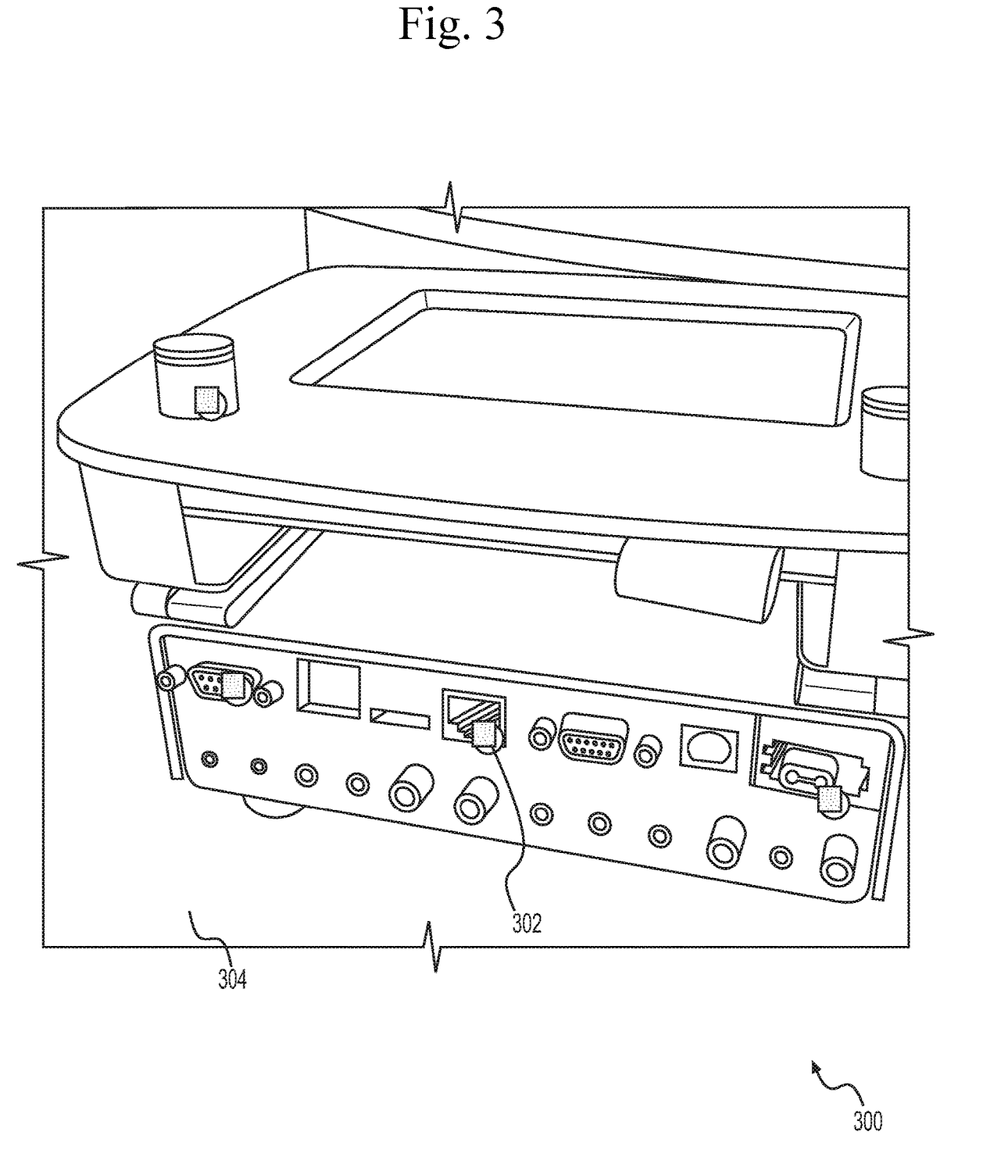
FIG. 3 illustrates an example of a 3D model according to embodiments of the present systems and methods.

An exemplary system 100 in which embodiments of the present systems and methods may be implemented is shown in FIG. 1. As shown in the example of FIG. 1, system 100 may include a platform 101 that may be or include a camera to capture video images of a three-dimensional (3D) object 104 as the camera moves through a plurality of viewpoints 102A-H to form a video stream 103. Platform 101 may be moving about following a path or trajectory 108. Video stream 103 may be transmitted to image processing system 106, in which processes involved in embodiments of the present systems and methods may be implemented. For example, image processing system 106 may perform 3D reconstruction by generating a 3D point cloud of the scene and/or objects in the scene, according to embodiments of the present systems and methods. An example of such a model 300 of an object is shown in FIG. 3. After a 3D point cloud of the scene including model 300 is generated, the points in the 3D point cloud may be segmented into being points 302 in the object represented by model 300, and points 304 that belong to the background.

Figure 2:
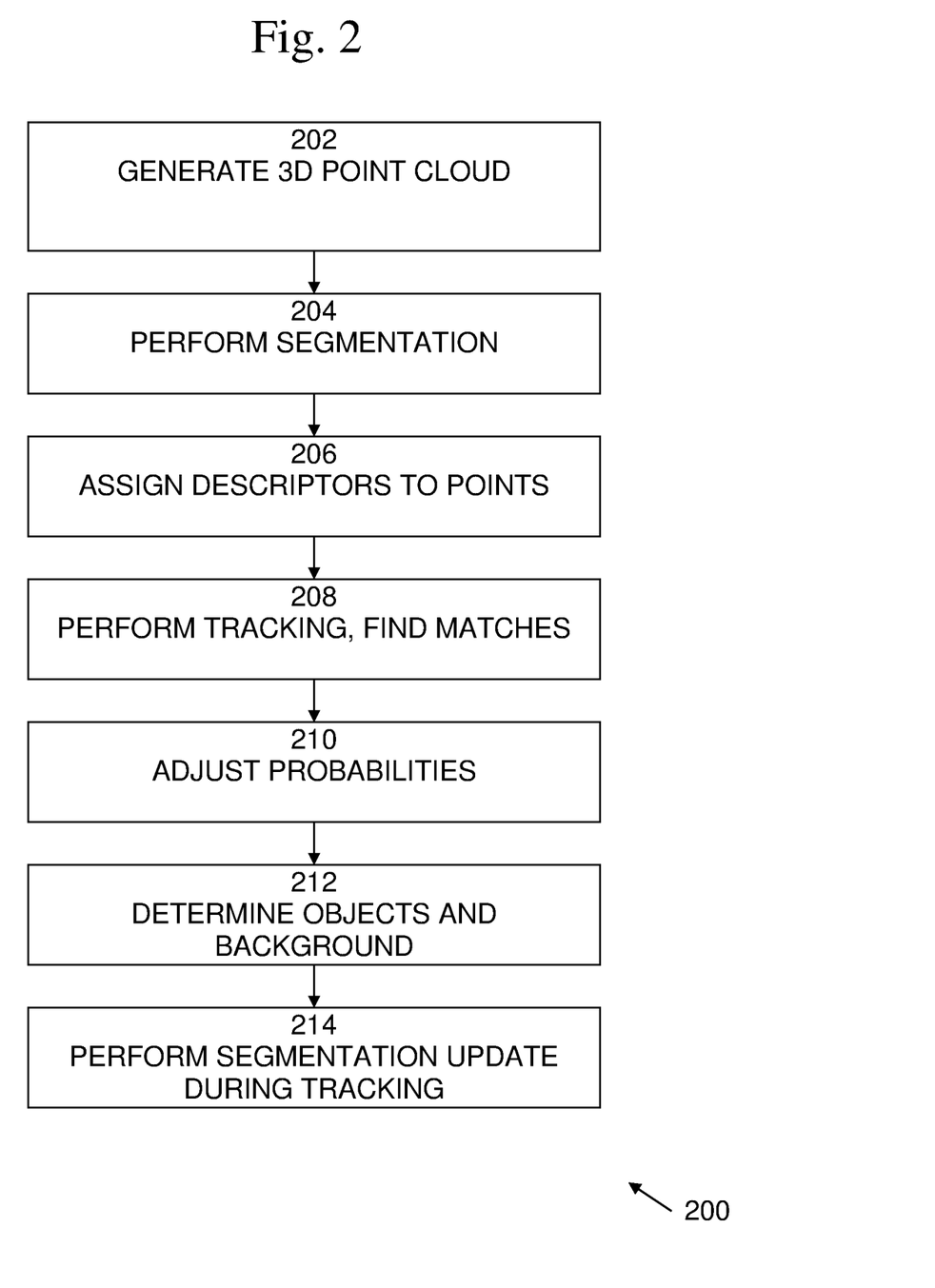
FIG. 2 is an exemplary flow diagram of an embodiment of a process, according to embodiments of the present systems and methods.

An embodiment of a process 200 of operation of embodiments of the present systems and methods is shown in FIG. 2. Process 200 begins with 202, in which a 3D point cloud may be generated. For example, video stream 103 may be received and a 3D point cloud for a model of an object may be reconstructed from video stream 103 with n points. Each point may be assigned a probability to be part of an object in a scene in video stream 103. In embodiments of Fuzzy segmentation, each point i in the 3D point cloud may be assigned a probability, denoted as $p_i$, to belong to an object. Then, $1-p_{i\,is}$ the probability to belong to the background. The probability $p_{i\,of}$ point i being part of an object may be initialized, for example, to 50%. The probabilities of all the points in the point cloud may be formed into a vector. At 204, given a point cloud and a probability vector P= $[p_0, p_1 \ldots p_n]$, segmentation may be performed by considering all points having $p_i > T$, a threshold, as belonging to the object.

Figure 4:
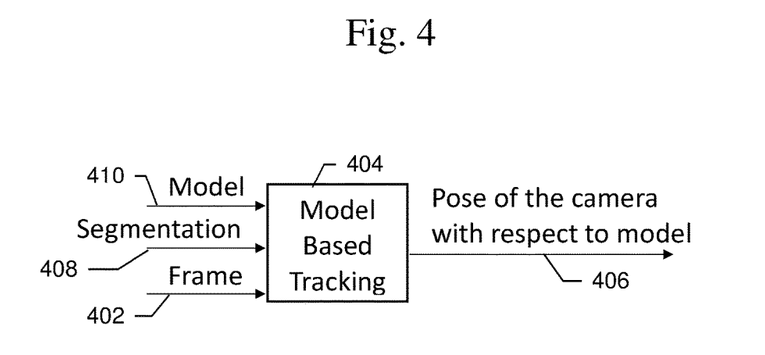
FIG. 4 is an exemplary diagram of using segmentation information to estimate the pose of the camera with respect to the model, according to embodiments of the present systems and methods.

At 206, in order to use the point cloud for tracking in an Augmented Reality (AR) session, each point may be assigned with some descriptors of its visual appearance from various viewpoints. The descriptor may be computed from the video used to reconstruct the point cloud. At 208, the 3D point cloud may be used for tracking a model of an object in an AR session. As shown in FIG. 4, for each frame 402 tracker 404 may, using segmentation information 408, estimate the pose 406 of the camera with respect to the model 410, and matching may be computed from the points' descriptor to points in the AR video stream 103. For example, estimation may be based on matching visual descriptors, such as scale-invariant feature transform (SIFT), which may be associate 3D points to image points. Segmentation may be used for choosing which 3D points to consider. For example, tracking may be performed using only points having $p_i$>T. Or, for example, tracking may be performed based on sampling points based on their probability. The result of the tracking may be the object position in video stream 103, as the tracker may output the estimated camera pose. Matches that supports the estimated pose may be considered inliers for the pose, while the other matches may be considered outliers.

Figure 5:
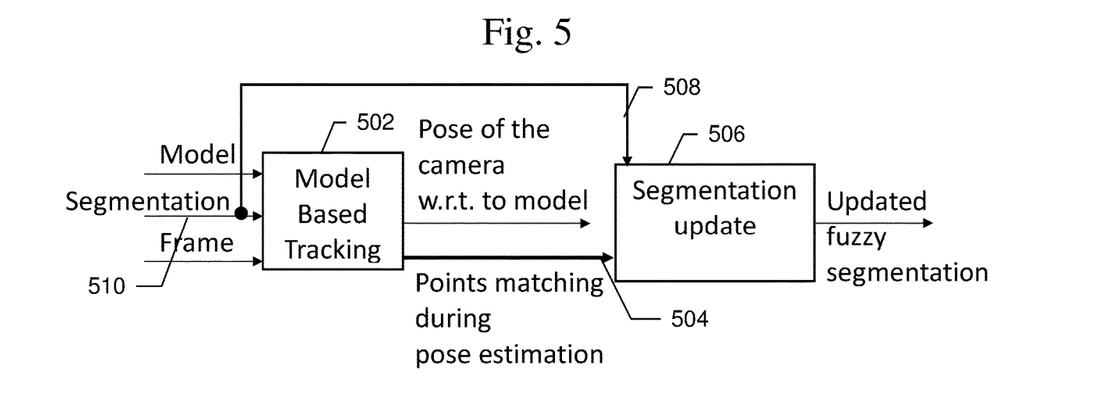
FIG. 5 is an exemplary diagram of using segmentation information to estimate the pose of the camera with respect to the model, with updating of segmentation information, according to embodiments of the present systems and methods.

At 210, the 3D points that belong to inlier matches may have their $p_i$ value increased, while points belong to outlier matches may have their $p_i$ value decreased. At 212, over time, the $p_i$ values will be adjusted by the process such that points that belong to the object may have high $p_1$ values, while background points may have low $p_i$ values. At 214, the determined segmentation may be updated to improve the segmentation. In embodiments, 3D-2D matching statistics, which may be internal data in the tracker, may be used to improve the segmentation. For example, the 3D points that belong to the object segment may be considered to usually be matched "correctly", while points that belong to the background may be considered to matched "badly". As shown in FIG. 5, in embodiments, for each point, model tracker 502 may output its matching error 504, and if it contributed to the pose estimation (inlier-outlier). That is, model tracker 502 may indicate which points were actually used for tracking (inliers) and which points were not (outliers). Segmentation update 506 may update the current segmentation 508 by increasing the $p_i$ value for inlier points and decreasing the $p_i$ value for outlier points and this may be used to update segmentation information 510, which may then be used be model tracker 502. Thus, information about which points were actually used for tracking and which points were not may be used to update the segmentation, which may then be used to improve the tracking.

Figure 6:
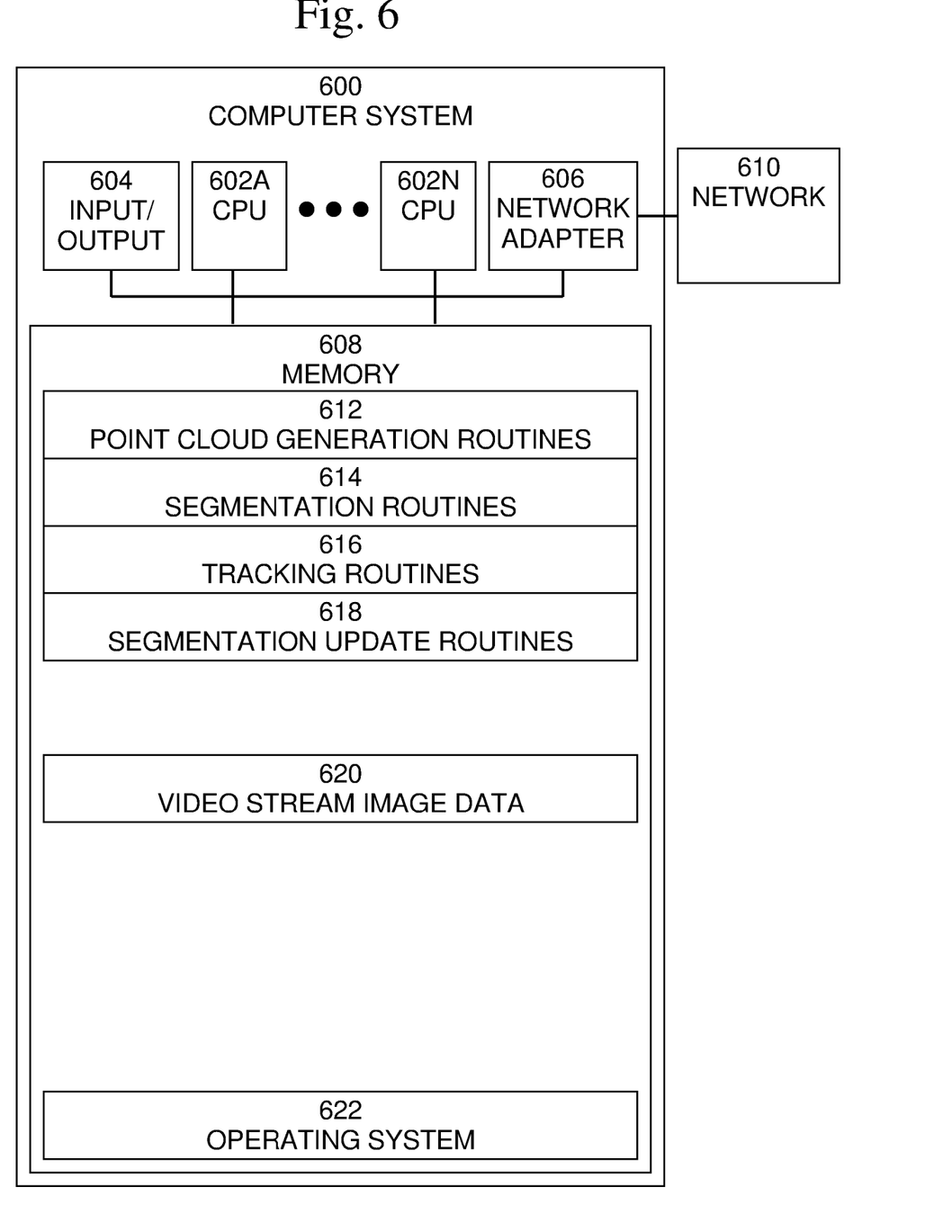
FIG. 6 is an exemplary block diagram of a computer system, in which processes involved in the embodiments described herein may be implemented.

An exemplary block diagram of a computer system 600, in which processes involved in the embodiments described herein may be implemented, is shown in FIG. 6. Computer system 600 may be implemented using one or more programmed general-purpose computer systems, such as embedded processors, systems on a chip, personal computers, workstations, server systems, and minicomputers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EE-PROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 6, memory 608 may include point cloud generation routines 612, segmentation determination routines 614, tracking routines 616, segmentation update 618, video stream image data 620, and operating system 622. Point cloud routines 612 may include software routines to generate 3d point cloud for a model of an object, which may be reconstructed from video stream image data 620, which may assign probabilities of each point in the point cloud being part of the object, and which may assign descriptors of visual appearance from various viewpoints. Segmentation determination routines 614 may include software routines to determine and update probabilities that each point is part of an object based on information received from tracking routines 616. Tracking routines 616 may include software routines to track the object position in video stream image data 620, output the estimated camera pose, and output information indicating whether each point was used to track the object, which may be used by segmentation determination routines 614 to determine and update probabilities that each point is part of an object. Operating system 634 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of segmenting a 3D point cloud into object and background segments, implemented in a computer comprising a processor, memory accessible by the processor, and computer program instructions stored in the memory and executable by the processor, the method comprising:
    tracking, at the computer system, a 3D model of an object in a scene in a video stream as a camera moves about the scene, wherein the tracking comprises determining for each point for each frame in the video stream whether the point corresponds to the object or whether the point corresponds to the background;
    segmenting, at the computer system, each of the plurality of points into either a point corresponding to the object or a point corresponding to the background based on a probability that the point corresponds to the object and a probability that the point corresponds to the background, wherein the probability that the point corresponds to the object is higher for each point the more often the tracking determines that the point corresponds to the object because the probability is increased when the tracking determines that the point corresponds to the object and the probability that the point corresponds to the background is higher for each point the more often the tracking determines that the point corresponds to the background because the probability is decreased when the tracking determines that the point corresponds to the background; and
    generating, at the computer system, augmented reality content based on the segmented 3D model of the object.

2. The method of claim 1, wherein the tracking comprises using the segmented 3D model of the object to estimate a pose of the camera with respect to the 3D model of the object.

3. The method of claim 2, wherein the 3D model of the object is initially segmented using a default setting of the probability for each point, and for each frame, the probability for each point is updated based on whether the tracking determines that the point corresponds to the object or to the background.

4. The method of claim 3, wherein the default setting of the probability for each point is 0.5.

5. The method of claim 1, wherein the 3D model of the object in the scene comprises a 3D point cloud comprising a plurality of points including at least some points corresponding to the object and at least some points corresponding to a background of the scene.

6. The method of claim 5, wherein the video stream was obtained from the camera moving about the scene.

7. A system for generating augmented reality content, comprising a processor, memory accessible by the processor, and computer program instructions stored in the memory and executable by the processor to perform:
    tracking a 3D model of an object in a scene in a video stream as a camera moves about the scene, wherein the tracking comprises determining for each point for each frame whether the point corresponds to the object or whether the point corresponds to the background;
    segmenting each of the plurality of points into either a point corresponding to the object or a point corresponding to the background based on a probability that the point corresponds to the object and a probability that the point corresponds to the background, wherein the probability that the point corresponds to the object is higher for each point the more often the tracking determines that the point corresponds to the object and the probability that the point corresponds to the background is higher for each point the more often the tracking determines that the point corresponds to the background; and
    generating augmented reality content based on the segmented 3D model of the object.

8. The system of claim 7, wherein the tracking comprises using the segmented 3D model of the object to estimate a pose of the camera with respect to the 3D model of the object.

9. The system of claim 8, wherein the 3D model of the object is initially segmented using a default setting of the probability for each point, and for each frame, the probability for each point is updated based on whether the tracking determines that the point corresponds to the object or to the background.

10. The system of claim 9, wherein the default setting of the probability for each point is 0.5.

11. The system of claim 7, wherein the 3D model of the object in the scene comprises a 3D point cloud comprising a plurality of points including at least some points corresponding to the object and at least some points corresponding to a background of the scene.

12. The system of claim 11, wherein the video stream was obtained from the camera moving about the scene.

13. A computer program product for generating augmented reality content, the computer program product comprising a non-transitory computer readable storage having program instructions embodied therewith, the program instructions executable by a computer, to cause the computer to perform a method comprising:
    tracking, at the computer system, a 3D model of an object in a scene in a video stream as a camera moves about the scene, wherein the tracking comprises determining for each point for each frame in the video stream whether the point corresponds to the object or whether the point corresponds to the background;
    segmenting, at the computer system, each of the plurality of points into either a point corresponding to the object or a point corresponding to the background based on a probability that the point corresponds to the object and a probability that the point corresponds to the background, wherein the probability that the point corresponds to the object is higher for each point the more often the tracking determines that the point corresponds to the object because the probability is increased when the tracking determines that the point corresponds to the object and the probability that the point corresponds to the background is higher for each point the more often the tracking determines that the point corresponds to the background because the probability is decreased when the tracking determines that the point corresponds to the background; and generating, at the computer system, augmented reality content based on the segmented 3D model of the object.

14. The computer program product of claim 13, wherein the tracking comprises using the segmented 3D model of the object to estimate a pose of the camera with respect to the 3D model of the object.

15. The computer program product of claim 14, wherein the 3D model of the object is initially segmented using a default setting of the probability for each point, and for each frame, the probability for each point is updated based on whether the tracking determines that the point corresponds to the object or to the background.

16. The computer program product of claim 15, wherein the default setting of the probability for each point is 0.5.

17. The computer program product of claim 13, wherein the 3D model of the object in the scene comprises a 3D point cloud comprising a plurality of points including at least some points corresponding to the object and at least some points corresponding to a background of the scene.

18. The computer program product of claim 17, wherein the video stream was obtained from the camera moving about the scene.

* * * * *